United States Patent [19]
Lustig et al.

[11] Patent Number: 4,963,419
[45] Date of Patent: Oct. 16, 1990

[54] MULTILAYER FILM HAVING IMPROVED HEAT SEALING CHARACTERISTICS

[75] Inventors: Stanley Lustig, Park Forest; Jeffrey M. Schuetz, Woodridge; Stephen J. Vicik, Darien, all of Ill.

[73] Assignee: Viskase Corporation, Chicago, Ill.

[21] Appl. No.: 49,242

[22] Filed: May 13, 1987

[51] Int. Cl.$^5$ ................ B32B 27/08; B32B 27/28; B65B 25/22

[52] U.S. Cl. ............... 428/36.7; 428/349; 428/424.4; 428/424.8; 428/448; 428/451; 428/516; 428/520; 428/910; 206/497; 264/209.7

[58] Field of Search ............. 428/36.7, 451, 448, 428/516, 424.4, 424.8, 349, 520

[56] References Cited

U.S. PATENT DOCUMENTS

| | | | |
|---|---|---|---|
| 3,646,155 | 2/1972 | Scott | 260/827 |
| 3,741,253 | 6/1973 | Brax et al. | 428/520 |
| 3,971,884 | 7/1976 | Meeks et al. | 174/120 SR |
| 4,049,867 | 9/1977 | Ito et al. | 428/412 |
| 4,115,612 | 9/1978 | Closson | 428/172 |
| 4,161,562 | 7/1979 | Yoshikawa et al. | 428/215 |
| 4,178,401 | 12/1979 | Weinberg et al. | 428/516 |
| 4,278,738 | 7/1981 | Brax et al. | 428/515 |
| 4,296,156 | 10/1981 | Lustig et al. | 428/35 |
| 4,348,437 | 9/1982 | Lustig et al. | 428/35 |
| 4,348,457 | 9/1982 | Rosenthal et al. | 428/349 |
| 4,351,876 | 9/1982 | Doi et al. | 428/349 |
| 4,395,459 | 7/1983 | Herschdorfer et al. | 428/391 |
| 4,448,792 | 5/1984 | Schirmer | 426/113 |
| 4,502,263 | 3/1985 | Crass et al. | 53/396 |
| 4,640,856 | 2/1987 | Ferguson et al. | 428/36 |
| 4,680,319 | 7/1987 | Gimpel et al. | 523/210 |
| 4,724,176 | 2/1988 | Sun | 428/35 |
| 4,797,235 | 1/1989 | Garland et al. | 264/22 |
| 4,857,250 | 8/1989 | Gale et al. | 264/83 |
| 4,868,022 | 9/1989 | Marx et al. | 428/35.1 |

FOREIGN PATENT DOCUMENTS

| | | | |
|---|---|---|---|
| 1125229 | 6/1982 | Canada | 204/91.34 |
| 263963 | 4/1988 | European Pat. Off. | |
| 8908628 | 8/1989 | Fed. Rep. of Germany | |

OTHER PUBLICATIONS

1984 Annual Book of ASTM Standards, vol. 08.01, D-883-83a, pp. 481 and 484 (1984, ASTM, Philadelphia).

Sax et al. (Ed.), Hawley's Condensed Chemical Dictionary, 11th Ed., p. 521 (1987, Van Nostrand Reinhold Company, Inc., New York).

M. Narkis et al, "Some Properties of Silane-Grafted Moisture-Crosslinked Polyethylene", Polymer Engineering and Science, vol. 25, No. 13, pp. 857–862 (Sep. 1985).

Primary Examiner—P. C. Sluby
Attorney, Agent, or Firm—Cedric M. Richeson

[57] ABSTRACT

A multilayer film is disclosed having improved heat sealing characteristics, comprising a first outer layer containing a heat sealable thermoplastic polymer having substantial freedom from cross-linking bonds, and a second layer containing a cross-linked ethylene polymer. In one embodiment the multilayer film is suitable for use in packaging primal and subprimal meat cuts, said film comprising a first outer layer containing a heat sealable thermoplastic polymer; a core layer comprising an oxygen barrier film; and a second outer layer comprising an ethylene polymer having siloxane cross-linking bonds. In another embodiment the multilayer film contains a second core layer containing an ethylene vinyl acetate copolymer, which is located between the barrier core layer and the second outer layer.

32 Claims, No Drawings

MULTILAYER FILM HAVING IMPROVED HEAT SEALING CHARACTERISTICS

FIELD OF THE INVENTION

This invention relates to a thermoplastic multilayer film suitable for use in the manufacture of heat-sealable bags for packaging primal and subprimal meat cuts. In particular, this invention relates to a heat sealable multilayer film containing one layer having poor heat sealability which comprises an ethylene polymer or copolymer cross-linked with siloxane bonds. More particularly, this invention relates to a multilayer film containing a heat sealable first outer layer, a core layer of a barrier film, and a second outer layer of nonsealable polyethylene containing cross-linking bonds. Most particularly, this invention relates to a heat sealable four-layer film, wherein a first outer layer of the film comprises an ethylene vinyl acetate copolymer, a first core layer comprises an oxygen barrier film, a second core layer comprises an ethylene vinyl acetate copolymer, and a second outer layer comprises an ethylene polymer or copolymer containing siloxane cross-linking bonds.

BACKGROUND OF THE INVENTION

Primal and subprimal meat cuts are large cuts of meat. They are smaller than a side of beef, for example, but larger than the ultimate cut which is sold at retail to the consumer. A primal cut comprises the entire section of a side of beef, such as the rib section or the rump roast section, while a subprimal cut comprises only a portion of such a section. Primal and subprimal cuts are prepared at the slaughter house and are then shipped to a retail meat store, or to an institution such as a hospital, hotel or restaurant, where they are butchered into smaller cuts of meat suitable for the individual consumer.

When primal and subprimal meat cuts, such as roast or rib sections, are prepared at the slaughter house, they are usually packaged in such a way that air (i.e., oxygen) is prevented from contacting the meat and moisture is prevented from leaving the meat. This is done in order to minimize spoilage and discoloration during shipping and handling. One desirable way to package primal and subprimal meat cuts so as to protect them from contact with air and from moisture loss is to shrink package them with a packaging material that has good oxygen and moisture vapor barrier properties. One such shrink packaging material that has good oxygen and moisture vapor barrier properties is polyvinylidene chloride film. (Polyvinylidene chloride copolymers are commonly referred to as PVDC.)

While polyvinylidene chloride film has excellent barrier properties, in actual practice, when polyvinylidene chloride is used as a monolayer film, it must be plasticized in order for the film to have adequate abrasion resistance and flexibility at storage temperatures of, for example, 30° to 50° F. Unfortunately, the addition of plasticizer sufficient to provide the requisite low temperature properties to the PVDC monolayer film has a significant adverse effect on the barrier properties of the film. While increasing the thickness of the film from the conventional thickness of 1.5 to 2.0 mils, to 5 mils or more, for instance, would improve the barrier properties of the film, it would be economically undesirable to use a monolayer film of polyvinylidene chloride having a thickness of 5 or more mils. Also, if such thick films were employed, bags made from the film would be difficult to gather and clip closed at the open end.

One approach to the provision of a film having barrier properties which are better than those of the 1.5 to 2.0 mil monolayer polyvinylidene chloride film previously used for shrink packaging primal and subprimal cuts, is to employ a multilayer film, one layer of which is polyvinylidene chloride having a minimum amount of plasticizer. The other layer or layers of such multilayer films are selected so as to provide the requisite low temperature properties and abrasion resistance which are lacking in the polyvinylidene chloride layer containing little or no plasticizer.

In providing such a film, however, it must be recognized that good oxygen and moisture vapor barrier properties, abrasion resistance, and low temperature properties are not the only requirements for a film that is to be used for shrink packaging primal and subprimal meat cuts. The film must have been biaxially stretched in order to produce shrinkage characteristics sufficient for the film to heat-shrink within a specified range of percentages, e.g., from about 15 to 60 percent at about 90° C., in both the machine and the transverse directions. (Conventionally, the term "MD" refers to machine direction and the term "TD" refers to transverse direction.) The film must be heat sealable in order to be able to fabricate bags from the film and in order to heat seal the open ends of the fabricated bags after insertion of the meat product. The heat sealed seams of the bags must not pull apart during the heat shrinking operation, and the film must resist puncturing by sharp bone edges during the heat shrinking operation. Also, there must be adequate adhesion between the several layers of the film so that delamination does not occur, either during the heat shrinking operation or during exposure of the film to the relatively high temperatures that may be reached during shipping and storage of the film in the summertime.

One recent development in the packaging of primal and subprimal meat cuts is the use of a machine system wherein the multilayer bag containing the primal or subprimal meat cut is placed in an evacuation chamber wherein all air is evacuated from the chamber and from the bag contained therein. The mouth of the evacuated bag, which has been placed in a lay-flat condition upon the back-up bar or anvil of an impulse heat sealing unit contained within the evacuation chamber, is then sever-sealed within the evacuated chamber by the immediate action of the heat sealing unit. The sealing bar of the heat sealing unit comes down from the top of the evacuation, chamber and pins the bag mouth tightly to the back-up bar so that the film is immobilized during sealing. The sealing bar contains an impulse heat sealing element and a severing knife. The knife severs excess multilayer film from the bag mouth which is being sealed by the impulse sealing element. A specified voltage is applied to the impulse sealing element for a time sufficient to heat and thereby fuse the two inside layers of the flattened bag mouth so that the evacuated bag is sealed tightly without damage to the seal or to the adjacent body of the evacuated bag. Such a machine system is taught, for example, in U.S. Pat. No. 4,541,224 to Mungai.

Closing the mouth of an evacuated bag in this manner eliminates the problems encountered with clipping the bag mouth closed. The clip-closing of the bag mouth requires the tight gathering of the bag mouth into compressed folds which are locked in place by the application of a plastic or metal clip. The gathered folds are not always air tight, so that air will often leak thereafter into the evacuated bag through the folds and cause spoilage of the meat contained therein. Sometimes such leakage can be eliminated by adjusting the crimping pressure of the clipping device so that the clip can more tightly grip the gathered bag mouth, but such a move is not always successful. Often, the clip will hold the gathered bag mouth so tightly that clip damage occurs. Clip damage arises when the clip is so tight that it severs the multi-layer plastic film in one or more of the gathered folds, thereby allowing air to leak into the evacuated bag through the severed folds.

Closing the mouth of the evacuated bag by the heat sealing technique is not always troublefree either, however. Sometimes the inside layers of the multilayer film in the bag mouth do not completely and tightly fuse together. At other times the multilayer film in the bag mouth will overheat and damage will occur. Such damage includes the melting of the film so that it flows out from under the sealing bar to leave a defective seal. It also includes charring of the film. Damage to the seal in the bag mouth in this manner is commonly referred to as "burn-through". In any event, defective seals caused by inadequate fusion of the bag mouth or by burn-through allow air to leak into the evacuated bag and thereby spoil the meat contained therein.

In order to avoid such sealing defects, it is not only important that the heat sealing unit be in proper adjustment, but it is also important that the sealable outer layer of the multilayer film, which is fabricated into the bag, have heat sealing characteristics which are compatible with the heat sealing operation. Moreover, once the heat seal has been made, the evacuated and sealed bag is sent to a shrink tunnel wherein it is exposed to a temperature, conventionally about 90° C., which is sufficient to shrink the multilayer bag down tightly onto the enclosed meat product in order to present an attractive finished package for shipment to the purchaser. It is essential that the heat seals not delaminate during the heat shrinking operation. That is to say, the shrink tension in the multilayer film must not be sufficient to cause the fused inner plies of the heat seal to peel away from each other and thereby allow air to seep into the bag.

The prior art teaches the fabrication of films having improved physical characteristics by the cross-linking of the heat sealable layer. It is also known that the heat sealing characteristics of a film may be affected by adjustment of the monomer content of the thermoplastic copolymer. The prior art also teaches films having improved heat sealing characteristics by the addition of specified novel chemical constituents to the heat sealing layer.

Brax et al teach in U.S. Pat. No. 3,741,253 a multilayer film having a first outer layer of a cross-linked copolymer of ethylene and vinyl acetate, a core layer of an oxygen barrier film (PVDC), and a second outer layer of ethylene vinyl acetate copolymer which is not cross-linked. The cross-linking is achieved by irradiation of only the first outer layer of the film at a dosage of from 2 to 15 megarads. This cross-linked ethylene vinyl acetate copolymer layer provides the heat sealing layer when the film is fabricated into a bag. Brax et al teach that the radiation dosage will effect the physical properties of the irradiated ethylene vinyl acetate layer and, further, that the vinyl acetate content of the ethylene vinyl acetate copolymer will also effect physical properties. In particular, Brax et al teach that seals delaminate when the vinyl acetate content of the copolymer exceeds 18 wt. %.

In U.S. Pat. No. 4,448,792 Schirmer teaches a cook-in shrink bag fabricated from a multilayer film having a first heat sealing and food contacting layer composed of propylene homopolymer or copolymer; a second heat shrinkable layer composed of a blend of propylene homopolymer or copolymer and butylene homopolymer or copolymer; a third adhesive layer composed of irradiatively cross-linkable ethylene copolymer: a fourth barrier layer comprising vinylidene chloride copolymer; a fifth adhesive layer of irradiatively cross-linkable ethylene copolymer: and a sixth optical clarity layer comprising propylene homopolymer or copolymer; wherein the entire six layer film has been irradiated either before or after the multilayer film has been biaxially stretched. Among the several key benefits enumerated by Schirmer, the completely irradiated six layer film provides for heat seals having high temperature resistance, while at the same time being acceptable for food contact in terms of minimum levels of extractables. Cook-in bags made of this multilayer film will maintain seal integrity when submerged in water at 80° C. for 12 hours.

Schirmer also teaches in U.S. Pat. No. 3,808,304 that the heat sealability of oriented polypropylene may be improved by blending into the polypropylene a specified percentage of polybutene-1. Polypropylene is only slightly sealable at temperatures below its melting point, and Schirmer discovered that blends of polypopylene and polybutene-1 could be heat sealed at temperatures below 220° F. and even as low as 160° F. Neither polymer by itself can be heat sealed at these temperatures. The strength of the heat seal was found to depend on the sealing temperature and the blend ratio. No irradiation or cross-linking of the film is required.

U.S. Pat. No. 4,502,263 to Crass et al covers a sealable transparent polyolefinic multilayer film comprising a base layer of polypropylene polymer and at least one sealable layer. The sealable layer contains a propylene copolymer, a low-molecular weight resin, a propylene homopolymer, and a polydiorganosiloxane. The film has a wide sealing range, low sealing temperature, high gloss, improved scratch resistance, and good reliability of running in high-speed packaging machines.

U.S. Pat. No. 4,348,457 to Rosenthal et al disclosed a sealable multilayer film comprising a polypropylene layer and at least one sealable layer comprising an ethylene homopolymer or copolymer which contains an additive combination of a long-chain amine, a thermoplastic polymer incompatible with the ethylene sealing polymer, and a polydialkyl siloxane. There is no specific teaching of the cross-linking of any layer. The film has improved sliding properties and has very good processability in high speed packaging machines. It is especially suitable for wrapping individual packs of cigarettes.

With this then being the state of the art, it is an object of the present invention to provide a multilayer film having improved heat sealability.

It is another object of the present invention to provide a heat shrinkable multilayer film, suitable for use in packaging primal and subprimal meat cuts, having improved heat sealability.

It is a further object of the present invention to provide a multilayer film having improved heat sealability under conditions experienced in an impulse heat sealing device.

It is a still further object of the present invention to provide a heat shrinkable multilayer film, suitable for use in packaging primal and subprimal meat cuts, having improved heat sealability under conditions experienced in an impulse heat sealing device.

SUMMARY OF THE INVENTION

Despite the foregoing teachings in the prior art, we have now discovered that the heat sealability of a multilayer film may be improved without modification of the heat sealing layer. In our inventive multilayer film, the conventional heat sealing layer is neither cross-linked, nor is the monomer content modified, nor is any additive or other polymer blended thereinto.

Surprisingly, we provide improved heat sealing by cross-linking a layer other than the heat sealing layer. In contrast, all prior attempts to improve the heat sealing characteristics of a multilayer film, as taught in the prior art known to us, focus on the heat sealing layer itself.

In accordance with the present invention, there is provided a heat shrinkable multilayer film having improved heat sealing characteristics, which comprises (a) a first layer containing a heat sealable thermoplastic polymer or copolymer, and (b) a second layer containing an ethylene homopolymer or copolymer having cross-linking bonds. Preferably, the cross-linking bonds are siloxane bonds. It is particularly to be noted that said first heat sealable layer has substantial freedom from cross-linking bonds and said second layer typically has poor heat sealability. In a preferred embodiment, said first and second layers are the outer layers of the multilayer film.

As used herein, when making reference to the heat sealing layer or to the heat sealable thermoplastic polymer or copolymer of the heat sealing layer, the term "heat sealable" means that the polymer or copolymer of the heat sealing layer has the ability to seal to itself under normal conditions of elevated temperature and elevated pressure to provide a fused seam which has a high bonding strength, which is highly resistant to delamination, and which is resistant to burn-through. In reference to the second layer, the term "poor heat sealability" means that the ethylene polymer or copolymer of the second layer will not properly bond to itself under typical commercial heat sealing conditions to form a hermetic seal, so that the fused seam will have poor bond strength and will be easily delaminated. "Easy delamination" means that the fused seam is readily pulled apart with no tearing of the seamed film. Referring to the heat sealing layer as "having substantial freedom from cross-linking bonds" means that the melt index of the thermoplastic heat sealing layer is not significantly lowered during the process of converting the resin of the heat sealing layer into the finished multilayer film product.

In one preferred embodiment, the present invention provides a heat shrinkable biaxially stretched, multilayer film, suitable for use in packaging primal and subprimal meat cuts and having improved heat sealing characteristics, which comprises, (a) a first outer layer containing a heat sealable thermoplastic polymer or copolymer; (b) a core layer comprising an oxygen barrier film; and (c) a second outer layer comprising an ethylene polymer or copolymer having siloxane cross-linking bonds.

In a more preferred embodiment, the present invention provides a heat shrinkable biaxially stretched multilayer film, suitable for use in packaging primal meat cuts and having improved heat sealing characteristics, which comprises, (a) a first outer layer containing a heat sealable polymer, (b) a first core layer comprising an oxygen barrier film, c) a second core layer comprising an ethylene vinyl acetate copolymer, and (d) a second outer layer comprising an ethylene polymer or copolymer having siloxane cross-linking bonds.

In a particularly preferred embodiment of the instant invention, there is provided a heat-shrinkable, biaxially stretched four layer film, suitable for use in packaging primal and subprimal heat cuts, said film comprising (a) a first outer layer of a heat sealable polymer, such as an ethylene-vinyl acetate copolymer, or a b)end of ethylene-vinyl acetate copolymer with another heat-sealable polymer; (b) a first core layer serving as an oxygen barrier, which may, for example comprise a polyVinylidene chloride copolymer or an ethylene-vinyl alcohol copolymer; (c) a second core layer comprising an ethylene-vinyl acetate copolymer; and (d) a second outer layer of an ethylene polymer or copolymer having siloxane cross-linking bonds, such as a very low density polyethylene or a blend of linear low density polyethylene and high density polyethylene.

The present invention also comprehends plastic bags fabricated from the inventive multilayer film, as well as methods for producing said film and said bags.

DETAILED DESCRIPTION

In greater detail, all embodiments of this invention contain a first outer layer of a heat-sealable polymer which may comprise an ethylene-vinyl acetate copolymer having a vinyl acetate content of from about 2 percent to about 15 percent, and preferably, from about 2 percent to about 8 percent, based on the weight of the copolymer, and a melt index of from about 0.1 to about 1.0 decigram per minute. This range for the vinyl acetate content is necessary in order to insure that the multilayer film will have the desired ease of biaxial stretching and the required shrinkage characteristic for the finished multilayer film. This melt index range is necessary because the ethylene vinyl acetate copolymer is difficult to extrude when the melt index is below 0.1, and it is difficult to biaxially stretch when the melt index is above 1.0. This ethylene vinyl acetate copolymer may be a single copolymer, or it may be a blend of two or more copolymers having differing melt indices and differing vinyl acetate-contents, provided that the blended melt index and the blended vinyl acetate content fall within the prescribed ranges.

In an alternative embodiment, the first outer layer comprises a blend of said ethylene-vinyl acetate copolymer and a high density polyethylene having a density of from about 0.94 to about 0.96 gram per cubic centimeter and a melt index of from about 0.1 to about 1.0 decigram per minute. Adding a high density polyethylene to the ethylene-vinyl acetate copolymer increases the high temperature puncture resistance of the film. However, as the level of the high density polyethylene in the blend is increased, the shrinkage property of the film decreases. When the content of high density polyethylene in the first outer layer is increased to greater than 30 weight percent, the shrinkage property of the film becomes unacceptable. Thus, the first outer layer of the multilayer film of this invention preferably comprises said ethylene-vinyl acetate copolymer, and up to about 30 weight percent of said high density polyethylene blended with said ethylene-vinyl acetate copolymer.

In a further alternative embodiment, the ethylene vinyl acetate copolymer may be blended with a very low density polyethylene or a linear low density polyethylene. These polyethylene copolymers are defined more particularly hereinafter.

Preferred embodiments of the present invention contain a first core layer which preferably comprises an oxygen barrier material selected from the group consisting of (1) a vinylidene chloride-vinyl chloride copolymer having a vinylidene chloride content of from about 65 to about 95 weight percent, and a vinyl chloride content of from about 5 to about 35 weight percent, (2) a vinylidene chloride-methyl acrylate copolymer having a vinylidene chloride content of from about 85 to about 95 weight percent and a methyl acrylate content of from about 5 to about 15 weight percent, and (3) an ethylene-vinyl alcohol copolymer having an ethylene content of from about 28 to about 48 mole percent and a vinyl alcohol content of from about 52 to about 72 mole percent, with a saponification degree of not less than about 96 percent.

The two vinylidene chloride copolymers preferably contain less than 5 weight percent of a plasticizer and, more preferably, less than 4 weight percent, the percentages being based on the weight of the total blend, i.e., including the copolymer and all additives such as the plasticizer, in order to maximize the barrier properties of the film. Conventional plasticizers such as dibutyl sebacate and epoxidized soybean oil may be employed therein For the ethylene vinyl alcohol copolymers, plasticizers may also be added to the extent required for the specific film application.

More preferably, the vinylidene chloride-vinyl chloride copolymer will contain at least about 65 weight percent, and not more than about 95 weight percent, of polymerized vinylidene chloride because, when the vinylidene chloride content is less than about 65 weight percent, the oxygen and moisture barrier property of the copolymer is diminished. If the vinylidene chloride content is more than 95 weight percent, the vinylidene chloride-vinyl chloride copolymer is generally not extrudable.

When the first core layer comprises a vinylidene chloride-methyl acrylate copolymer, the vinylidene chloride content should not exceed about 95 weight percent. This is because, when the vinylidene chloride content is greater than about 95 weight percent, the vinylidene chloride-methyl acrylate copolymer is generally not extrudable. However, the vinylidene chloride content should not be less than about 85 weight percent of the vinylidene chloride-methyl acrylate copolymer in order to maintain the level of methyl acrylate in the copolymer at not greater than 15 weight percent, which is the maximum level of methyl acrylate allowed by the United States Food and Drug Administration for food contact applications.

When the first core layer comprises ethylene vinyl alcohol, the ethylene content of the ethylene-vinyl alcohol copolymer should be at least 28 mole percent, because if it is less than about 28 mole percent, the film becomes less flexible and is difficult to biaxially stretch. Also, when the ethylene content of said copolymer is greater than about 48 mole percent, the oxygen barrier property of the barrier film diminishes.

Those embodiments of the inventive multilayer film which contain more than three layers contain a second core layer which preferably comprises an ethylene-vinyl acetate copolymer selected from the group consisting of (a) an ethylene-vinyl acetate copolymer having a melt index of from about 0.1 to about 1.0 decigram per minute and a vinyl acetate content of from about 3 to about 18 weight percent, and preferably from about 10 to about 15 weight percent, based on the weight of said ethylene-vinyl acetate copolymer, and (b) a blend of two ethylene-vinyl acetate copolymers, wherein one of said ethylene-vinyl acetate copolymers has a melt index of from about 0.1 to about 1.0 decigram per minute and a vinyl acetate content of from about 10 to about 18 weight percent, based on the weight of said copolymer, and the other ethylene-vinyl acetate copolymer has a melt index of from about 0.1 to about 1.0 decigram per minute and a vinyl acetate content of from about 2 to about 10 weight percent, based on the weight of said copolymer. The blend (b) of said two ethylene-vinyl acetate copolymers has a vinyl acetate content of from about 2 to about 18 weight percent, and preferably from about 10 to about 15 weight percent, based on the weight of said copolymers.

The second core layer of the multilayer film of this invention may also contain a polyurethane having a Shore A hardness of from about 75 to about 90 as measured in accordance with the method set forth in ASTM D-2240. The impact strength properties of biaxially stretched multilayer film containing a layer comprising 100% polyurethane degrade with time. The addition of an ethylene-vinyl acetate copolymer to the polyurethane prevents this degradation of film properties. Accordingly, a preferred embodiment of this invention comprises a multilayer film wherein the second core layer is a blend of a polyurethane and up to about 40 weight percent of ethylene-vinyl acetate copolymer. Greater than about 40 weight percent ethylene-vinyl acetate copolymer in said blend likewise causes the impact strength properties of the film to degrade. The ethylene-vinyl acetate copolymer useful in said blend may have a vinyl acetate content of from about 12 percent up to about 50 percent, based on the weight of the copolymer, and a melt index of from about 0.5 to about 40 decigrams per minute.

All embodiments of the present invention contain a second outer layer which comprises an ethylene polymer or copolymer which contains siloxane cross-linking bonds. The polyethylene may be the product of a high pressure catalytic process or a low pressure catalytic process.

The high pressure process produces polymers which are highly branched, with higher densities being an indication of shorter branches and higher crystallinity. Such polymers are conventionally classified as low density polyethylene, commonly called "LDFE", which has a density below about 0.925 grams per cubic centimeter, and high density polyethylene, commonly called "HDPE", which has a density greater than about 0.940 grams per cubic centimeter. Polyethylenes having a density in the range of from about 0.925 to about 0.940 are commonly referred to as medium density polyethylene.

The ethylene may also be copolymerized with other monomers in the high pressure process, such as vinyl acetate, ethyl acrylate, or acrylic acid.

The low pressure process produces polymers which are more linear in structure. Such polymers are commonly classified as very low density polyethylene, commonly called "VLDPE", which has a density of from about 0.860 to about 0.915 grams per cubic centimeter, and linear low density polyethylene, commonly called "LLDPE", which has a density greater than about 0.915 grams per cubic centimeter.

Very low density polyethylene and linear low density polyethylene are copolymers of ethylene with a higher alpha olefin. The higher alpha olefins which can be polymerized with ethylene to produce the low modulus linear copolymers can contain from three to eight carbon atoms. These alpha olefins should not contain any branching on any of their carbon atoms closer than two carbon atoms removed from the double bond. Suitable alpha olefins include propylene, butene-1, pentene-1, hexene-1, 4-methylpentene-1, heptene-1 and octene-1. The preferred alpha olefins are propylene, butene-1, hexene-1, 4-methylpentene-1 and octene-1.

In some instances, one or more dienes, either conjugated or non-conjugated, may have been present in the polymerization reaction mixture. Such dienes may include, for example, butadiene, 1,4-hexadiene, 1,5-hexadiene, vinyl norbornene, ethylidene norbornene and dicyclopentadiene.

In one preferred embodiment of the present invention, the second outer layer of the multilayer film of this invention comprises a linear polyethylene. It has been found that using a linear polyethylene in the second outer layer of the multilayer film provides the film with an abrasion resistance which is improved over similar films containing outer layers of ethylene-vinyl acetate copolymers, and it also provides loading and shrink tunnel survival rates which are superior to the survival rates of those films containing ethylene-vinyl acetate copolymer outer layers. The linear polyethylene of this layer has a melt index of from about 0.5 to about 2.0 decigrams per minute and a density of from about 0.86 to about 0.93 gram per cubic centimeter. When the melt index is below 0.5 decigrams per minute, the film is difficult to extrude, and resins having a melt index above 2.0 decigrams per minute are not film grade resins. As previously noted hereinabove, those copolymers having a density in the range of from about 0.86 to about 0.915 grams per cubic centimeter are commonly referred to as a very low density polyethylene, while those having a density in the range of from about 0.915 to about 0.930 grams per cubic centimeter are commonly referred to as linear low density polyethylene.

In addition, high density polyethylene may be added to the linear polyethylene (VLDPE or LLDPE) in order to improve the abrasion resistance of the film. As the level of high density polyethylene added to the second outer layer is increased, the abrasion resistance of the film continues to increase. However, when the level of high density polyethylene is increased to greater than 30 weight percent of the second outer layer blend, the shrinkage property of the film becomes unacceptable. Thus, the amount of high density polyethylene in the blend should not exceed 30 weight percent. The high density polyethylene useful in the second outer layer has a melt index of from about 0.1 to about 1.0 decigram per minute, and a density of from about 0.94 to about 0.96 gram per cubic centimeter. Resins having a melt index below 0.1 decigrams per minute are not extrudable, and those having a melt index above 1.0 decigrams per minute produce films of dimished strength.

The ethylene polymer or copolymer, or blends thereof, in the second outer layer are cross-linked by reaction of the polyethylene with an unsaturated hydrolyzable organosilane at a temperature above about 140° C. in the presence of a compound capable of generating free radical sites on the polyethylene structure, this reaction typically producing a silane-grafted polymer which contains Si-OR groups, and subsequently exposing this grafted copolymer of polyethylene and silane to moisture in the presence of a silanol condensation catalyst. A comprehensive teaching of this two stage procedure may be found in U.S. Pat. No. 3,646,155 issued to Scott, all the teachings of which are incorporated herein by reference.

The silane has a general formula $RR'SiY_2$, wherein R represents a monovalent olefinically unsaturated hydrocarbon or hydrocarbonoxy radical. The Y represents a hydrolysable organic radical and the R' represents an R radical or a Y radical.

The R group will be a monovalent aliphatically unsaturated hydrocarbon radical or hydrocarbonoxy radical which is reactive with the free radical sites generated on the polyethylene chain. Examples of such radicals are vinyl, allyl, butenyl, cyclohexanyl, cyclopentadienyl, and cyclohexadienyl. The vinyl radical is the most preferred.

The Y group represents any hydrolysable organic radical. For example, Y may be an alkoxy radical, such as the methoxy, ethoxy and butoxy radicals. Also, Y may be an acyloxy radical such as a formyloxy, acetoxy or propionoxy radical. Oximo radicals, such as $-ON=C(CH_3)_2$, are also functional, as are substituted amino radicals such as alkylamino and arylamino radicals, examples of which include $-NHCH_3$ and $-NHC_2H_5$.

The group R' may be an R group or a Y group, but the Y group is preferred. Thus, the silane will preferably contain three hydrolysable organic radicals.

Among the most preferred silanes are vinyl triethoxysilane and vinyl trimethoxysilane. Also preferred are vinyl triisobutoxysilane and vinyl tri-2-ethylhexoxysilane.

The free radical generating compound should have a half life at the silane grafting reaction temperature of less than six minutes and preferably less than one minute. The best known and preferred compounds are the organic peroxides and peresters such as, for example, benzoyl peroxide, dichlorobenzoyl peroxide, dicumyl peroxide, tertiary butyl peracetate, and tertiary butyl perbenzoate. Azo compounds are also suitable, such as azobisisobutyronitrile and dimethylazodi isobutyrate. Although dicumyl peroxide is preferred, the particular free radical generating compound chosen will depend upon the reaction temperature at which the silane is grafted on the polyethylene structure. Thus, if the reaction is run at about 190° C. to 200° C., then dicumyl peroxide is preferred since it has a half life of about 15 seconds at this temperature. If the reaction is run at about 150° C., benzoyl peroxide is suitable since it has an appropriate short half life at this temperature.

When grafting a vinyl silane onto the polyethylene chain, at least two different graft copolymers of the polyethylene-vinyl silane can be produced. One product may be prepared by a high pressure peroxide initiated copolymerization of polyethylene and vinyl trimethoxysilane to give a graft copolymer with the silicon atom attached directly to the backbone of the polyethylene polymer chain. The other graft copolymer may be produced by the free radical grafting of either vinyl triisobutoxysilane or vinyl tri-2-ethylhexoxysilane onto the polyethylene with the silicon atom being two carbon atoms removed from the backbone. With either product, the maximum amount of bound vinyl siloxane content is about 3 weight percent.

The subsequent cross-linking of the silane modified polyethylene is effected by exposing the silane grafted polyethylene to moisture in the presence of a silanol condensation catalyst. Preferably, the cross-linking is undertaken at a temperature above 50° C., and most preferably by exposing the polyethylene grafted copolymer to steam at 100° C. or higher. Other means of elevating the temperature of the polyethylene may be used.

Suitable silanol condensation catalysts are well known in the art. Such materials include, for example, metal carboxylates such as dibutyltin dilaurate, stannous acetate, lead naphthenate, zinc octoate, iron-2-ethylhexoate and cobalt naphthenate. Also suitable are organic metal compounds such as the titanium esters and chelates, including for example, tetrabutyl titanate and tetranonyl titanate. Organic bases are also suitable, such as ethylamine hexylamine, dibutylamine, and piperidine, as are acids such as mineral acids and fatty acids. The preferred catalysts are the organic tin compounds such as, for example, dibutyltin dilaurate, dibutyltin diacetate, and dibutyltin dioctoate.

In one preferred embodiment of the siloxane cross-linked ethylene polymers and copolymers which are utilized in the second outer layer of the multilayer film of this invention, the silane polyethylene copolymer is compounded with a catalyst, such as dibutyltin dilaurate or tetramethyl titanate, to promote the cross-linking reaction at some later date. Without exposure to moisture at elevated temperatures, this copolymer resin is substantially a storage-stable polymer. Accordingly, the inventive film may be manufactured by preparing the film with the unreacted polymer and then exposing the multilayer film to conditions of temperature and moisture sufficient to cross-link the ethylene polymer or copolymer of the second outer layer.

In an alternate embodiment, uncross-linked resin may be exposed to cross-linking conditions while the resin is being extruded into film form. The use of such resins eliminates the necessity of undertaking the cross-linking reaction after the multilayer film is fabricated.

For each of these methods it is the presence of moisture at a suitably elevated temperature which effects rapid cross-linking of the copolymer by means of the siloxane groups. This is accomplished chemically by the reaction of water with the $-Si(-OR)_3$ group to give $-Si(OH)_3$. The loss of water then occurs between two $-Si(OH)_3$ groups on adjacent polymer chains to form the cross-linked siloxane bonds, which have the structure of $-Si-O-Si-$.

Other than water, the by-product formed from the cross-linking reaction is the respective alcohol. It is with respect to the alcohols that we reach the crux of a problem that must be dealt with in considering these polymers for many end-use applications. Because the level of bound vinyl siloxane in the copolymers can be as high as 3 percent by weight, the amount of free alcohol produced during the cross-linking reaction can also be on the order of 1 to 3 weight percent 10,000–30,000 parts per million, ppm). This very high level of residual alcohol is available for migration into food products which are contained within any monolayer bag which is ultimately fabricated from the film which is produced from such a cross-linked resin. This migration of alcohol is of concern from a health standpoint, as well as because of the potential for end food product taste and odor problems.

This potential for alcohol migration is not a problem when using the multilayer films of the present invention, however, since the siloxane cross-linking bonds occur in the outer layer of the bag, and the other layers provide a suitable barrier to alcohol migration. Thus, in the inventive multilayer film of the present invention, the bag outer layer of an ethylene copolymer containing siloxane cross-linking bonds provides improved sealing performance of the inner bag layer comprising the heat sealable copolymer, while the other layers of the multilayer film eliminate the potential problem of alcohol migration.

The thermoplastic multilayer film of this invention can be produced by known basic techniques, but modified in order to effect the siloxane cross-linking reaction. For example, the multilayer film may be prepared by coextruding the film layers through an annular die to produce a primary tube, and then biaxially stretching the multilayer tubular film in accordance with the conventional "doublebubble" technique disclosed in Pahlke U.S. Pat. No. 3,456,044. Alternatively, the films may be fabricated by extrusion coating, wherein a base tube is extruded and succeeding layers are surface coated on the base tube in a manner such as that disclosed in U.S. Pat. No. 3,741,253 to Brax et al. (It must be noted, however, that whereas Brax et al irradiate the base tube and thereby cross-link their heat sealing layer, we do not cross-link the inner layer which is the sealing layer, either by irradiation or by chemical means.) Also, the multilayer film may be slot cast and biaxially stretched by tentering before the resulting sheet is fabricated into bags. Still further, the inventive multilayer film may be fabricated by producing separate film layers and then laminating the layers together.

In one preferred embodiment of the present invention, the multilayer film comprises a biaxially stretched thermoplastic three layer film having a total thickness of from about 1.75 mils to about 4.5 mils, and preferably from about 2.0 mils to about 3.0 mils. Films of less than about 1.75 mils thickness will generally not have the necessary puncture resistance, and films of greater than about 4.5 mils will produce bags which will be somewhat difficult to gather and clip closed or they may be difficult to heat seal closed at efficient speeds on heat sealing vacuum packaging machines. The heat sealing first outer layer will preferably have a thickness of from about 1.1 mils to about 1.8 mils; the core layer of oxygen barrier film will preferably have a thickness of from about 0.25 mil to about 0.45 mil; and the second outer layer of siloxane cross-linked ethylene copolymer will have a thickness of from about 0.35 mil to about 2.0 mils, but preferably from about 0 5 mil to about 1.0 mils.

In this three layer film embodiment, the thickness of the first outer layer is preferably within the aforementioned range in order to obtain good seal strength and acceptable film shrinkage. The thickness of the first core layer is preferably within the aforementioned range in order to provide adequate oxygen barrier without detracting from toughness properties, but the upper limit of 0.45 mil is based upon the extent of the barrier protection which is required for the intended use for the multilayer film. The thickness of the second outer layer is preferably within the aforementioned range in order to make up the total film thickness and to provide properties of abrasion resistance and puncture resistance.

In another preferred embodiment of the present invention the multilayer film comprises a biaxially stretched thermoplastic four layer film having a total thickness of from about 2.5 mils to about 4.5 mils. The 2.5 mil lower limit is established by the total thickness achieved in adding the lower limit of thickness for the four individual layers. As previously noted, films having a thickness greater than about 4.5 mils will produce bags which will be somewhat difficult to gather and clip closed or they may be difficult to heat seal closed at efficient speeds on heat sealing vacuum packaging machines. The heat sealing first outer layer will preferably have a thickness of from about 1.1 mils to about 1.8 mils; the first core layer of oxygen barrier film will preferably have a thickness of from about 0.25 mil to about 0.45 mil; the second core layer will preferably have a thickness of from about 0.8 mil to about 1.2 mils; and the second outer layer of siloxane cross-linked polyethylene copolymer will preferably have a thickness of from about 0.35 mil to about 2.0 mils, but more preferably from about 0.5 mil to about 1.0 mils.

The thickness of the first outer layer is preferably within the aforementioned range in order to obtain good seal strength and acceptable film shrinkage. The thickness of the first core layer is preferably within the aforementioned range in order to provide adequate oxygen barrier without detracting from toughness properties, but the upper limit of 0.45 mil is based upon the extent of the barrier protection which is required for the intended use for the multilayer film. The thickness of the second core layer is preferably within the above-indicated range in order to enhance the puncture resistance of the film without being too costly. The thickness of the second outer layer is preferably within the aforementioned range in order to make up the total film thickness and to provide properties of abrasion resistance and puncture resistance.

In addition to providing improved heat sealing when the film is fabricated into bags, multilayer films of the present invention have good abrasion resistance and good toughness. Thus, these films have utility in many packaging applications. However, in a preferred embodiment, these films are fabricated into bags for the packaging of primal and subprimal meat cuts.

Such bags may be produced from the multilayer films of this invention by any suitable method, such as by heat sealing the side and/or bottom edges. For instance, if the film of this invention is produced in the form of a tubular film, bags can be produced therefrom by heat sealing one end of a length of the tubular film, or by sealing both ends of the tube end and then slitting one edge to form the bag mouth. If the film of this invention is made in the form of flat sheets, bags can be formed therefrom by sealing three edges of two superimposed sheets of film. When carrying out a heat sealing operation, the surfaces which are heat sealed to each other to form seams are the said first outer layers of the films of this invention. Thus, for example, when forming a bag by heat sealing one edge of a length of tubular film, the inner surface of the tube, i.e., the surface which will be heat sealed to itself, will be the said first outer layer of the film. Accordingly, the first outer layer of the film becomes the inner surface of the bag and the second outer layer of the film becomes the outer surface of the bag.

The invention is further illustrated by the examples which follow. In the following examples, all parts and percentages are by weight, unless otherwise indicated.

The properties of the copolymer resins and of the films produced therefrom may be determined by the following methods:

Density:
 ASTM D-1505—plaque is conditioned for one hour at 100° C. to approach equilibrium crystallinity—reported as gms/cm$^3$.

Melt Index (MI):
 ASTM D-1238—Condition E—measured at 190° C.

Haze:
 ASTM D-1003, procedure A.

Gloss:
 ASTM D-523, 45° Angle.

Extractables:
 ASTM D-2765, Method A.

Impulse Sealing:
 The impulse sealing test is run to determine the acceptable voltage range for sealing a plastic film. A Sentinel Model 12-12AS laboratory sealer manufactured by packaging Industries Group, Inc., Hyannis, MA is used. Sealing conditions of 0.5 second impulse time, 2.2 seconds cooling time, and 50 psi jaw pressure are typically used. The minimum voltage s determined as that voltage which is capable of sealing two pieces of multilayer film together, thereby simulating a common heat seal. The maximum sealing voltage is determined as the voltage at which seal burn-through begins to occur on the two pieces. Burn-through is defined as holes or tears in the seal caused by the high temperature and pressure of the sealing ribbon. This has a detrimental effect on seal strength and integrity, as well as on final package appearance. Additional tests are run on four pieces of multilayer film. For the four piece test, two pieces of film are placed with the heat sealing surfaces in face to face relationship as in a common heat seal. A third piece of multilayer film is placed on top of the two pieces with the nonsealing outer layer in face to face relationship with the nonsealing layer at the top of the other two pieces. A fourth piece of multilayer film is then placed on top of the three pieces with the heat sealing surface of the fourth piece in face to face relationship with the top surface of the stacked three pieces. Thus, the three interfaces of the four piece stack are heat sealing, nonsealing and heat sealing, in that order. The four piece heat sealing test simulates a fold or wrinkle which may commonly occur in a bag mouth which is hurriedly placed on the anvil or backup bar of the heat sealing unit of a commercial evacuator-sealing device. Minimum voltage is determined on the four pieces, with minimum voltage indicating the lower limit for sealing the two sealable interfaces. In any event, the nonsealable interface between the two sealed interfaces remains substantially unsealed. The acceptable sealing range on commercial heat sealing equipment is the range between the minimum volts required to achieve a strong heat seal in the four piece test and the maximum volts which can be tolerated without burn-through on the two piece test.

EXAMPLE I

A group of ethylene copolymer resins with siloxane cross-linking bonds were extruded into monolayer films. These films were obtained from Union Carbide Corporation, Danbury, CT. The films DXFD 1265, DXFD 1266 and DXFD 1267 are siloxane cross-linked very low density polyethylene (VLDPE) while the film DXFD 1276 is a copolymer of ethylene with ethylacrylate, the copolymer being commonly identified as EEA (ethylene ethylacrylate). The extruded monolayer films are compared with two multilayer films which are commercially used for packaging primal and subprimal meat cuts. Both films comprise a first outer layer of ethylene vinyl acetate (EVA) having a melt index (MI) of 0.25 decigrams per minute and containing about 12 wt. % vinyl acetate; a core layer of polyvinylidene chloride (PVDC) comprising vinylidene chloride copolymerized with 13 to 16 wt. % of vinyl chloride; and a second outer layer of ethylene vinyl acetate (EVA) having a melt index of 0.5 decigrams per minute and containing 15 wt. % of vinyl acetate. The first outer layer is the heat sealable layer, and both films are produced by Viskase Corporation, Chicago, Illinois. The PERFLEX ® 62 Film is unirradiated and uncross-linked EVA/PVDC/EVA. The EZ-SEAL PERFLEX ® 62 Film is EVA/PVDC/EVA which has been irradiated throughout all three layers.

The test results appear in Table 1.

TABLE I

Properties Of Polyethylene Copolymers Containing Siloxane Cross-Linking Bonds

| Sample Number | Resin or Film | Gauge Wt. % | Gauge Mil | Impulse Seal Test Volts Minimum(a) | Impulse Seal Test Volts Maximum(b) |
|---|---|---|---|---|---|
| 1 | DXFD 1265, VLDPE | 30 | 1.78 | >40 | — |
| 2 | DXFD 1265, VLDPE | 30 | 6.08 | >40 | — |
| 3 | DXFD 1266, VLDPE | 40 | 5.78 | >40 | — |
| 4 | DXFD 1267, VLDPE | 20 | 6.35 | >40 | — |
| 5 | DXFD 1276, EEA | NA(c) | 5.72 | >40 | — |
| 6 | PERFLEX ® 62 Film EVA/PVDC/EVA | 95 | 2.4 | 27 | 29 |
| 7 | EZ SEAL PERFLEX ® 62 EVA/PVDC/EVA Irradiated | 85 | 2.4 | 27 | 40 |

(a)Minimum voltage is a four piece test.
(b)Maximum voltage is a two piece test.
(c)Not available.

The percent extractables is an indication of the cross-linking, since it shows the amount which is soluble in the decahyronaphthalene (Decalin) solvent. Thus, Sample 1 has 30 wt. % extractables, which means that about 70 wt. % of the monolayer film is cross-linked. Sample 6 shows 95 wt. % extractables in the multilayer film, but this film is not cross-linked. It is believed that the 5% of insoluble material is from the PVDC core layer. Sample 7 shows 85 wt. % extractables in the multilayer film, and the 15% insoluble material is probably 5% from the PVDC core layer and about 10% of cross-linked EVA from the two outer layers.

An impulse sealing test was conducted on the monolayer films and on the multilayer films. The monolayer films of siloxane cross-linked polyethylene copolymer, Samples 1 through 5, all had minimum sealing voltages above 40. This means that these films would not heat seal on the impulse heat sealing device. The multilayer films of sample 6 and 7, comprising the EVA/PVDC/EVA structure, both have a minimum sealing voltage of 27 volts. Defective sealing occurs below this voltage. Sample 6 which is not cross-linked shows a maximum voltage of 29. which means that burn-through occurs above this voltage. In contrast, cross-linked Sample 7 has a maximum voltage of 40, which signifies that no burn-through will occur under commercial heat sealing conditions.

This Example shows that the ethylene copolymers which contain siloxane cross-linking bonds cannot be heat sealed under conventional impulse sealing conditions.

EXAMPLE 2

Specimens of prior art Samples 1 through 5 were laminated to specimens of Sample 6 to produce samples 8 through 12 in accordance with this invention, so that the non-sealing outer layer of the resulting four layer laminate was the siloxane cross-linked ethylene copolymer, and the heat sealing EVA outer layer of the three layer structure was now the heat sealing layer of the new four layer structure. An impulse heat sealing test was conducted on samples of this four layer film and the results appear in Table 2. The minimum sealing voltage of the new four layer films was the same as for the original three layer film, i.e. 27 volts. Reliable heat sealing did not occur below 27 volts. However, whereas the maximum voltage for the three layer film is only 29 volts, burn-through occuring above this level, the four layer film samples all had a maximum voltage of greater than 40 volts. That is to say, the four layer films containing the siloxane cross-linked outer layer did not experience burn-through.

This Example shows that the heat sealable layer of the multilayer film of Sample 6 has a very narrow operating range of only 27 to 29 volts, and that this range can be enhanced to a range of from 27 to greater than 40 volts without modification of the heat sealable layer. This is accomplished by providing an outer layer of ethylene copolymer containing siloxane cross-linking bonds in accordance with this invention. This provides such

TABLE 2

Impulse Seal Test Of Four Layer Film Samples

| Sample Number | Film Description | Minimum Volts | Maximum Volts |
|---|---|---|---|
| 6 | PERFLEX ® 62 Film EVA/PVDC/EVA | 27 | 29 |
| 8 | EVA/PVDC/EVA/VLDPE using VLDPE of Sample 1 | 27 | >40 |
| 9 | EVA/PVDC/EVA/VLDPE | 27 | >40 |

TABLE 2-continued

Impulse Seal Test Of Four Layer Film Samples

| Sample Number | Film Description | Minimum Volts | Maximum Volts |
|---|---|---|---|
| 10 | EVA/PVDC/EVA/VLDPE using VLDPE of Sample 2 | 27 | >40 |
| 11 | EVA/PVDC/EVA/VLDPE using VLDPE of Sample 3 | 27 | >40 |
| 12 | EVA/PVDC/EVA/EEA using VLDPE of Sample 4 | 27 | >40 |
| | using EEA of Sample 5 | | |

Note:
Minimum volts is a four piece test.
Maximum volts is a two piece test.

multilayer films with an excellent heat sealing reliability under conditions which may be experienced in impulse heat sealing in commercial operations, where the sealing voltage may vary from machine to machine, or the voltage may fluctuate on a given machine, since such multilayer films containing the siloxane cross-linked outer layer will not experience burn-through. Those skilled in the art recognize that heat sealing voltage is correlatable with the temperature of the heat sealing environment.

EXAMPLE 3

Four layer films were produced by laminating films of VLDPE to the prior art three layer film of Sample No. 6, which has the multilayer film structure of EVA/PVDC/EVA. Samples No. 13 and 14 have the multilayer structure of EVA/PVDC/EVA/VLDPE. The first outer layer of each film, which is the heat sealing layer, is composed of ethylene vinyl acetate having a melt index of 0.25 decigrams per minute and a vinyl acetate content of 12 weight percent. The PVDC barrier layer has a vinylidene chloride content of 84 to 87 weight percent and a vinyl chloride content of 13 to 16 weight percent. The second core layer of EVA is an ethylene vinyl acetate having a melt index of 0.5 decigrams per minute and a vinyl acetate content of 15 weight percent. The second outer layer of VLDPE is a very low density polyethylene haVing a density of 0.906. In sample No. 13 the VLDPE was not cross-linked. This VLDPE was resin DFDA 1137 obtained from Union Carbide Corporation of Danbury, CT. In accordance with this invention, however, Sample No. 14 contained 70 weight percent gel which is not extractable. This gel is cross-linked ethylene copolymer containing siloxane bonds. This VLDPE was the film of Sample No. 1. Specimens of these films were subjected to a two piece impulse heat sealing test and to a four piece impulse heat sealing test.

The results are shown in Table 3, wherein comparison is made to the conventional commercial product of Sample No. 6. It is to be noted that the maximum voltage permissible before burn-through occurs for Sample No. 6 is 29 volts, and that Sample No. 13, which contains a VLDPE outer layer, improves this to a maximum voltage of 32. Sample No. 14, however, which contains the siloxane cross-linked VLDPE outer layer in accordance with this invention, improves this to a voltage greater than 40, which means that no burn-through occurs under conventional heat sealing conditions.

It is to be noted that the heat sealing range for the commercial multilayer film of Sample No. 6 is a 2 volt range of from 27 to 29 volts. By adding the outer layer of VLDPE in Sample No. 13, this range is marginally improved to a 4 volt range of from 28 to 32 volts, which is a range increase of only 2 volts. By adding the siloxane cross-linked VLDPE in Sample No. 14, however, the heat sealing range is unexpectedly expanded by more than another 10 volts to a 12 volt range of from 28 volts to greater than 40 volts, and the danger of burn-through is eliminated.

Thus, this Example shows that merely adding another layer of VLDPE as an outer layer does not greatly improve heat sealing characteristics of the multilayer film. It is the cross-linking of the VLDPE in accordance with this invention which surprisingly broadens the heat sealing range to a greater heat sealing reliability under commercial heat sealing conditions, and which eliminates the problem of burn-through.

TABLE 3

Impulse Sealing Properties Of Multilayer Films

| Sample Number | Film Structure | Gauge Mils | Minimum Sealing Voltage Two Piece Volts | Minimum Sealing Voltage Four Piece Volts | Maximum Sealing Voltage |
|---|---|---|---|---|---|
| 6 | EVA/PVDC/EVA | 2.4 | 22 | 27 | 29 |
| 13 | EVA/PVDC/EVA/VLDPE | 4.4 | 25 | 28 | 32 |
| 14 | EVA/PVDC/EVA/VLDPE VLDPE is cross-linked | 4.2 | 25 | 28 | >40 |

Note:
Maximum volts is a two piece test.

EXAMPLE 4

Several films were prepared using various siloxane cross-linking Process conditions. An extruder and a film tower were operated on several resins in a "single bubble" operation to produce blown films. Those skilled in the art recognize that such an operation does not biaxially stretch the films since it is not a "double bouble" operation as taught in U.S. Pat. No. 3,456,044 to Pahlke. The results are given in Table 4. The films had an average thickness of 1.5 mil.

A control film of ethylene vinyl acetate is listed as Sample No. 15. This EVA resin was purchased from Union Carbide Corporation of Danbury, CT, and it has the designation DQDA-6832. This EVA resin has a melt index of 0.25 decigrams per minute and a vinyl acetate content of 12 weight percent.

Sample No. 16 is a blend of 50 weight percent of the control EVA resin, DQDA-6832, and 50 weight percent of an ethylene-silane copolymer. The ethylene-silane copolymer comprised 1.5 wt. % vinyl trimethoxy silane and 98.5 wt. % of ethylene, and it had a melt index of 0.50 dg./min. This resin blend contained no silanol condensation catalyst. The film produced from the resin blend had a melt index of 0.50 dg./min., and it had optical properties of haze and gloss which are similar to the optical properties of the film of Sample No. 15.

TABLE 4
Properties Of Blown Films

| Sample Number | Resin Formulation | Haze % | Gloss 45° | Maximum Sealing Voltage* | Melt Index dg./min. Resin | Melt Index dg./min. Film |
| --- | --- | --- | --- | --- | --- | --- |
| 15 | 100% DQDA-6832 (EVA) | 3.4 | 67 | 28 | 0.25 | 0.28 |
| 16 | 50 parts DQDA-6832 (EVA) | 4.3 | 75 | 26 | 0.25 | 0.50 |
|  | 50 parts Ethylene-Silane |  |  |  | 0.50 |  |
| 17 | 50 parts DQDA-6832 (EVA) |  | No film due to high gel level |  | 0.25 | 0.006 |
|  | 50 parts Ethylene-Silane |  |  |  | 0.50 |  |
|  | 4 parts Tin Catalyst |  |  |  | NA |  |
| 18 | 50 parts DQDA-6832 (EVA) | 12.6 | 46 | 26 | 0.25 | 0.042 |
|  | 50 parts Ethylene-Silane |  |  |  | 0.50 |  |
|  | 4 parts Zinc Catalyst |  |  | NA |  |  |

*Maximum voltage is a two piece test.

Sample No. 17 was the same resin blend as Sample No. 16 except that it contained a silanol condensation catalyst. For every 100 parts of the resin blend of EVA and polyethylene-silane, there was an additional 4 parts (pph) of a tin catalyst masterbatch. This blend of resins and catalyst masterbatch produced film which could not be drawn down to a 1.5 mil thickness. The film was so brittle that it was not possible to establish the air bubble for making a blown film. The extrudate contained numerous gels which were visible to the eye, and the very low melt index of only 0.006 dg./min. immediately after extrusion indicates that the siloxane cross-linking bonds were forming prematurely within the extruder at an excessively rapid reaction rate.

Sample No. 18 Was the same resin blend as Sample No. 16 except that it contained a zinc catalyst masterbatch. This zinc masterbatch comprised 12.5 wt. % zinc stearate and 87.5% wt. % of the EVA control resin, DQDA-6832. For every 100 parts of the resin blend of EVA and polyethylenesilane, there was an additional 4 parts of the zinc catalyst masterbatch. Although the zinc catalyst is slower acting than the tin catalyst, this blend of resins and catalyst masterbatch produced film which also had a low melt index of 0.042 dg./min. immediately after extrusion, which indicates some early cross-linking. However, this film was drawn down to a 1.5 mil film thickness. No initial improvement in sealing voltage was found, however, and the haze and gloss measurements indicated that optical properties suffered.

A curing study for sample No. 18 is provided in Table 5. This film contained the zinc stearate condensation catalyst. Specimens of this film were exposed to ambient air or immersed in water at various temperatures and exposure times. The relative humidity of the air was unknown. Specimens held in air or in water at 195° F. did not cross-link sufficiently in sixteen hours to significantly improve the maximum sealing voltage. After 48 hours, however, such specimens displayed a maximum sealing voltage greater than 40 volts. Specimens stored at room temperature of 75° F. for three weeks did not show any significant improvement in maximum sealing voltage as compared to the Sample No. 15 control sample, the maximum being only increased from 26 volts to 28 volts.

This Example shows that in order to manufacture the multilayer films of this invention, elevated temperature is required in order to accomplish the necessary siloxane cross-linking within a reasonable time when using the slow acting zinc stearate catalyst. Additionally, this Example shows that it is possible to prematurely cross-link to such an extent within the extruder when the rapid acting tin catalyst is used, that no film production is possible. These two extremes of slow cross-linking and rapid cross-linking show that the selection of catalyst type and catalyst concentration for the silanol condensation catalyst is very important.

TABLE 5
Cross-Linking Of Sample No. 18

| Cure Conditions | | | Maximum |
| --- | --- | --- | --- |
| Temperature °F. | Time | Storage Environment | Sealing Voltage* |
| 195 | 16 hrs. | air | 28 |
| 195 | 48 hrs. | air | >40 |
| 195 | 16 hrs. | water | 31 |
| 195 | 48 hrs. | water | >40 |
| 75 | 16 hrs. | air | 28 |
| 75 | 48 hrs. | air | 28 |
| 75 | 1 week | air | 28 |
| 75 | 3 weeks | air | 28 |

*Maximum voltage is a two piece test.

However, it can be concluded from this Example that with proper selection of catalyst type and concentration, multilayer films having improved heat sealing characteristics can be produced which do not require extensive post-treatment with moisture or elevated temperature in order to produce the required degree of siloxane cross-linking. In fact, this Example demonstrates that such films of this invention may be produced without such post-treatment. Such an objective may be achieved by selecting the catalyst type and concentration so that cross-linking is initiated in the extruder, but is not completed until after the film has been completely formed and placed on the product roll.

EXAMPLE 5

This Example illustrates the manufacture of one embodiment of the multilayer films of this invention, as well as the fabrication of bags therefrom which are commercially acceptable for use in the packaging of primal and subprimal meat cuts.

A four layer film is produced by coextrusion to provide a primary tube which is then biaxially stretched in a manner such as that disclosed in U.S. Pat. No. 3,456,044 to Pahlke. The first outer layer of the film, which is the heat sealing layer, is composed of ethylene vinyl acetate having a melt index of 0.25 decigrams per minute and a vinyl acetate content of 12 weight percent. The PVDC barrier layer has a vinylidene chloride content of 84 to 87 weight percent and a vinyl chloride content of 13 to 16 weight percent. The second core layer of EVA is an ethylene vinyl acetate having a melt index of 0.5 decigrams per minute and a vinyl acetate content of 15 weight percent. The second outer layer of VLDPE is a very low density polyethylene having a density of 0.906.

The extruded multilayer film is stored in a hot room or 48 hours at 140° F. and relative humidity of 80%. The second outer layer of the multilayer film contains 70 weight percent gel which is not extractable. This gel is cross-linked VLDPE containing siloxane bonds.

The first outer layer comprising the heat sealing layer has a thickness of 1.4 mils, and the core layer containing the PVDC barrier copolymer has a thickness of 0.35 mil. The second core layer has a thickness of 0.65 mil, and the second outer layer of siloxane cross-linked VLDPE has a thickness of 1.8 mils. The inner layer of the biaxially stretched tubing is the first outer layer, which is the sealing layer, of the four layer film.

This tubing is passed through a bag making machine which sever-seals the tubing to produce bags having a bottom heat seal, an open bag mouth, and side edges of flattened tubing. The heat seals on the bottom of the bags have good seal strength and no burn-through over a wide temperature range. When the bags are loaded with meat, evacuated and sealed shut at the packing house, the bags also exhibit good seal strength and no burn-through over a wide temperature range. The bags have good puncture resistance and good abrasion resistance.

EXAMPLE 6

This Example illustrates the manufacture of another embodiment of the multilayer films of this invention, and the fabrication of bags therefrom which are commercially acceptable for use in packaging primal and subprimal meat cuts.

A four layer film is produced by coextrusion to provide a primary tube which is then biaxially stretched in a manner such as that disclosed in U.S. Pat. No. 3,456,044 to Pahlke. The first outer layer of the film, which is the heat sealing layer, is composed of ethylene vinyl acetate having a melt index of 0.25 decigrams per minute and a vinyl acetate content of 3 weight percent, blended with a high density polyethylene (HDPE) having a density of 0.953 grams per cubic centimeter and a melt index of 0.15 decigrams per minute. The blend comprises 85 weight percent EVA and 15 weight percent HHDPE. The core layer of barrier film comprises a polyvinylidene chloride copolymer containing 13 to 16 weight percent of vinyl chloride. The second core layer is a blend of 80 weight percent of a polyurethane and 20 weight percent of an ethylene vinyl acetate copolymer. The polyurethane has a density of 1.20 grams per cubic centimeter and a Shore Hardness of 78 Shore A. The ethylene vinyl acetate has a melt index of 6.0 decigrams per minute and a vinyl acetate content of 28 weight percent. The second outer layer comprises a linear low density polyethylene (LLDPE) containing siloxane cross-linking bonds. This LLDPE has a density of 0.920 grams per cubic centimeter and a melt index of 0.75 decigrams per minute.

The extruded biaxially stretched four layer film has a thickness of 3.6 mils. The heat sealable EVA inner layer of the tube is 1.5 mils thick and the first core layer of PVDC has a thickness of 0.35 mil. The second core layer containing the polyurethane blended with EVA is 0.8 mil thick. The second outer layer of cross-linked LLDPE has a thickness of 0.95 mil.

The extruded multilayer film is stored in a hot room for 48 hours at a temperature of 140° F. and a relative humidity of 80%. The second outer layer of the multilayer film contains 70 weight percent gel which is not extractable. This gel is cross-linked LLDPE containing siloxane bonds.

This tubing is passed through a bag making machine which sever-seals the tubing to produce bags having a bottom heat seal, an open bag mouth, and side edges of flattened tubing. The heat seals on the bottom of the bags have good seal strength and no burn-through over a wide temperature range. When the bags are loaded with meat, evacuated and sealed shut at the packing house, the bags also exhibit good seal strength and no burn-through over a wide temperature range. The bags have good puncture resistance and good abrasion resistance.

EXAMPLE 7

This Example illustrates the manufacture of still another embodiment of the multilayer films of this invention, and the fabrication of bags therefrom which are commercially acceptable for use in packaging primal and subprimal meat cuts.

A three layer film is produced by coextrusion to provide a primary tube which is then biaxially stretched in a manner such as that disclosed in U.S. Pat. No. 3,456,044 to Pahlke. The first outer layer of the film, which is the heat sealing layer, is composed of ethylene vinyl acetate having a melt index of 0.25 decigrams per minute and a vinyl acetate content of 12 weight percent. The PVDC barrier layer has a vinylidene chloride content of 84 to 87 weight percent and a vinyl chloride content of 13 to 16 weight percent. The second outer layer of VLDPE is a very low density polyethylene having a density of 0.906.

The extruded multilayer film is stored in a hot room for 48 hours at a temperature of 140° F. and a relative humidity of 80%. The second outer layer of the multilayer film contains 70 weight percent gel which is not extractable. This gel is cross-linked VLDPE containing siloxane bonds.

The first outer layer comprising the heat sealing layer has a thickness of 1.4 mils, and the core layer containing the PVDC barrier copolymer has a thickness of 0.35 mil. The second outer layer of siloxane cross-linked VLDPE has a thickness of 0.65 mil. The inner layer of the biaxially stretched tubing is the first outer layer, which is the sealing layer, of the three layer film.

This tubing is passed through a bag making machine which sever-seals the tubing to produce bags having a bottom heat seal, an open bag mouth, and side edges of flattened tubing. The heat seals on the bottom of the bags have good seal strength and no burn-through over a broad temperature range. When the bags are loaded with meat, evacuated and sealed shut at the packing house, the bags also exhibit good seal strength and no burn-through over a wide temperature range. The bags have good puncture resistance and good abrasion resistance.

From the foregoing examples, those skilled in the art will recognize that the present invention affords means for improving the heat sealing characteristics of a multilayer film without modification of the heat sealing layer. The heat sealing layers of the foregoing examples are conventional heat sealing layers in commercial use. They need not contain additives or other polymers which have been added pursuant to prior art teachings to improve sealability. Additionally, they are substantially free of cross-linking bonds.

Surprisingly, we provide improved heat sealing by cross-linking a layer other than the heat sealing layer. In contrast, based upon our understanding of the prior art, all known prior attempts to improve the heat sealing characteristics of a multilayer film focus on the heat sealing layer itself.

In summary, the novel film compositions of this invention have been shown to possess improved physical properties which make them suitable for use in bags for packaging. In particular, the films of this invention provide bags having improved performance characteristics in the packaging of primal and subprimal meat cuts. The bags provide improved heat sealing characteristics with good toughness properties. In particular, the bags have good abrasion resistance and good puncture resistance.

Although preferred embodiments of this invention have been described in detail, it is contemplated that modifications thereof may be made, and that some preferred features may be employed without others, all with the spirit and scope of the broad invention. For example, although four-layer films are a preferred embodiment, multilayer films having more or less than four layers are contemplated within the scope of this invention. Additionally, although the heat sealing layers of the present invention preferably comprise an ethylene vinyl acetate copolymer, those skilled in the art realize that other heat sealing layers may be utilized, such as an ionomer layer, a propylene-ethylene copolymer layer, a very low density polyethylene copolymer layer, or a linear low density polyethylene copolymer layer. As still another variation, the heat sealing layer may comprise a blend of at least two polymers, such as ethylene vinyl acetate blended with very low density polyethylene or with linear low density polyethylene. In some embodiments an adhesive layer may be necessary to bond the heat sealing outer layer or the siloxane cross-linked outer layer to the core layers. Furthermore, those skilled in the art will recognize that the multilayer films of this invention may contain conventional additives such as pigments, antiblock agents, slip agents, and the like.

In the method aspects of the present invention, it is preferred to produce the film in a coextrusion process. One such method is to coextrude the multilayer film, expose the film to moisture, and then biaxially stretch the film. Another method is to coextrude the multilayer film, biaxially stretch the film, and then expose to moisture. As noted in Example 4, certain selected silanol condensation catalysts can initiate cross-linking of the second outer layer in the extruder without exposure to moisture, and thereby eliminate the need to cure the film after biaxial stretching. However, the amount and type of catalyst used must be carefully controlled in order to assure the effective production of the multilayer films of this invention. Additionally, the time required to cure or cross-link the multilayer film in a post-treatment step will be variable, since it will depend upon the type and the amount of catalyst being used, as well as upon the temperature and moisture level to which the multilayer film is exposed. Further, it is also within the scope of the present invention to use a polymer or copolymer resin for the second outer layer which already has been cross-linked with siloxane bonds, provided that is has not been cross-linked to such a level that it cannot be extruded into a film structure.

The present invention is now set forth with particularity in the claims which follow. As used in the claims, the term "polymer" includes homopolymers and copolymers.

We claim:

1. A multilayer film having improved heat sealing characteristics, which comprises (a) a first outer layer containing a heat sealable thermoplastic polymer having substantial freedom from cross-linking bonds, and (b) a second layer having poor heat sealability and containing a cross-linked ethylene polymer containing siloxane cross-linking bonds.

2. The multilayer film of claim 1 wherein said second layer is an outer layer.

3. The multilayer film of claim 2 wherein said second layer is selected from the group consisting of low density polyethylene, high density polyethylene, very low density polyethylene and linear low density polyethylene.

4. The multilayer film of claim 2 wherein said second layer comprises a copolymer of ethylene and a monomer selected from the group consisting of vinyl acetate, ethyl acrylate and acrylic acid.

5. The multilayer film of claim 2 wherein said second layer comprises a polyethylene blend containing high density polyethylene.

6. The multilayer film of claim 2 wherein said second layer is selected from the group consisting of low density polyethylene, high density polyethylene, very low density polyethylene and linear low density polyethylene.

7. The multilayer film of claim 1 wherein and said second layer comprises a copolymer of ethylene and a monomer selected from the group consisting of vinyl acetate, ethyl acrylate and acrylic acid.

8. The multilayer film of claim 1 wherein said second layer comprises a polyethylene blend containing high density polyethylene.

9. The multilayer film of claim 1 containing a third layer of an oxygen barrier film.

10. The multilayer film of claim 1 wherein said first outer layer comprises a heat sealable polymer selected from the group consisting of an ethylene vinyl acetate copolymer, an ionomer, a propylene-ethylene copolymer, a very low density polyethylene, and a linear low density polyethylene.

11. The multilayer film of claim 10 wherein said first outer layer comprises an ethylene vinyl acetate copolymer.

12. A multilayer film, suitable for use in packaging primal and subprimal meat cuts and having improved heat sealing characteristics, said film comprising:
    (a) A first outer layer containing a heat sealable thermoplastic polymer;
    (b) A core layer comprising an oxygen barrier film; and
    (c) A second outer layer comprising an ethylene polymer having siloxane cross-linking bonds.

13. The multilayer film of claim 12 wherein said first outer layer comprises a heat sealable polymer selected from the group consisting of an ethylene vinyl acetate copolymer, an ionomer, a propylene-ethylene copolymer, a very low density polyethylene, and a linear low density polyethylene.

14. The multilayer film of claim 13 wherein said first outer layer comprises an ethylene vinyl acetate copolymer.

15. The multilayer film of claim 14 wherein said first outer layer comprises an ethylene vinyl acetate copolymer blended with an ethylene polymer selected from the group consisting of high density polyethylene, very low density polyethylene, and linear low density polyethylene.

16. The multilayer film of claim 12 wherein said core layer is selected from the group consisting of (a) a vinylidene chloride-vinyl chloride copolymer, (b) a vinylidene chloride-methyl acrylate copolymer, and (c) an ethylene vinyl alcohol copolymer.

17. The multilayer film of claim 12 wherein said second outer layer comprises an ethylene polymer selected from the group consisting of low density polyethylene, high density polyethylene, very low density polyethylene, and linear low density polyethylene.

18. The multilayer film of claim 12 wherein said second outer layer comprises a copolymer of ethylene and a monomer selected from the group consisting of vinyl acetate, ethyl acrylate and acrylic acid.

19. The multilayer film of claim 12 wherein said second outer layer comprises a polyethylene blend containing high density polyethylene.

20. The multilayer film of claim 19 wherein the high density polyethylene is blended with very low density polyethylene or linear low density polyethylene.

21. A multilayer film, suitable for use in packaging primal meat cuts and having improved heat sealing characteristics, said film comprising:
   (a) A first outer layer containing a heat sealable thermoplastic polymer;
   (b) A first core layer comprising an oxygen barrier film;
   (c) A second core layer comprising an ethylene vinyl acetate copolymer; and,
   (d) A second outer layer comprising an ethylene polymer containing siloxane cross-linking bonds.

22. The multilayer film of claim 23 wherein said first outer layer comprises a heat sealable polymer selected from the group consisting of an ethylene vinyl acetate copolymer, an ionomer, a propylene-ethylene copolymer, a very low density polyethylene, and a linear low density polyethylene.

23. The multilayer film of claim 24 wherein said first outer layer comprises an ethylene vinyl acetate copolymer.

24. The multilayer film of claim 23 wherein said first outer layer comprises an ethylene vinyl acetate copolymer blended with a polyethylene polymer selected from the group consisting of high density polyethylene, very low density polyethylene, and linear low density polyethylene.

25. The multilayer film of claim 21 wherein said core layer is selected from the group consisting of (a) a vinylidene chloride-vinyl chloride copolymer, (b) a vinylidene chloride-methyl acrylate copolymer, and (c) an ethylene vinyl alcohol copolymer.

26. The multilayer film of claim 21 wherein said second core layer comprises a blend of two ethylene vinyl acetate copolymers.

27. The multilayer film of claim 21 wherein said second core layer comprises a blend of ethylene vinyl acetate copolymer and a polyurethane.

28. The multilayer film of claim 21 wherein said second outer layer comprises an ethylene polymer selected from the group consisting of low density polyethylene, high density polyethylene, very low density polyethylene, and linear low density polyethylene.

29. The multilayer film of claim 21 wherein said second outer layer comprises a copolymer of ethylene and a monomer selected from the group consisting of vinyl acetate, ethyl acrylate and acrylic acid.

30. The multilayer film of claim 21 wherein said second outer layer comprises a polyethylene blend containing high density polyethylene.

31. The multilayer film of claim 30 wherein the high density polyethylene is blended with very low density polyethylene or linear low density polyethylene.

32. A plastic bag fabricated from a multilayer film in accordance with any of claims 1 through 31.

* * * * *

UNITED STATES PATENT AND TRADEMARK OFFICE
CERTIFICATE OF CORRECTION

PATENT NO. : 4,963,419

DATED : OCTOBER 16, 1990

INVENTOR(S) : STANLEY LUSTIG, JEFFREY M. SCHUETZ, STEPHEN J. VICIK

It is certified that error appears in the above-identified patent and that said Letters Patent is hereby corrected as shown below:

```
In col. 6, line 11, change "heat" to --meat--.
In col. 6, line 13, change "b)end" to --blend--.
```

Signed and Sealed this

Sixth Day of October, 1992

Attest:

DOUGLAS B. COMER

Attesting Officer     Acting Commissioner of Patents and Trademarks